May 3, 1966  H. T. WILLS  3,249,036

PHOTOGRAPHIC APPARATUS

Filed May 22, 1963

INVENTOR.
Howard T. Wills
BY Brown and Mikulka
ATTORNEYS

United States Patent Office 3,249,036
Patented May 3, 1966

3,249,036
PHOTOGRAPHIC APPARATUS
Howard T. Wills, Beverly, Mass., assignor to Polaroid Corporation, Cambridge, Mass., a corporation of Delaware
Filed May 22, 1963, Ser. No. 282,449
12 Claims. (Cl. 95—89)

This invention relates to photographic apparatus for use in a camera with individual film units or assemblies in which camera the film assemblies are both exposed and processed, and especially to apparatus providing at one end of the camera a pair of relatively adjacent exit apertures, including guide means, for passing sequentially first and second leader elements of each film assembly and a closure device for covering and uncovering the apertures in conjunction with the processing of the film assemblies.

The present photographic apparatus is particularly adapted to use with a so-called self-developing camera including certain processing apparatus thereof of the type described in the copending U.S. patent applications of Rogers B. Downey, Serial No. 203,265, filed June 18, 1962, now Patent No. 3,132,572, and Serial No. 268,882, filed March 29, 1963, now Patent No. 3,165,039, and with film assemblies of the general type shown in U.S. Patents 3,079,849 and 3,080,805. In the aforesaid patent applications there is described apparatus for processing individual film assemblies or units of a film pack in which each film assembly, comprising a photosensitive sheet, a second sheet and a releasably-contained processing liquid is exposed and advanced between a pair of pressure rolls to release the liquid and spread it evenly between the sheets, so as to form an image on one of the sheets by a diffusion transfer process. The film assembly is first advanced by manually drawing upon a so-called pull tab thereof extending through a first exit slot until a leader of the film assembly, to which the tab is releasably connected, is advanced between the pressure rolls and protrudes slightly through a second exit slot of the camera. The tab separates from the leader and, thereafter, the leader is manually drawn upon, to advance the film assembly between the pressure rolls for the above-described purpose, between a pair of margin-compressing elements for holding the released liquid confined to the film assembly, and through the second exit slot to a location outside of the camera.

In another U.S. patent application, namely, that of Joel A. Hamilton, Serial No. 268,999, filed March 29, 1963, now Patent No. 3,165,040, a closure device is described relating to a self-developing camera and a plurality of film assemblies of the aforementioned type in the form of a film pack, each film assembly having manual advancing means, also in the form of a pull tab and a leader for use in the processing operation. The referenced device includes a closure member or door positioned in front of one, only, of two adjacent exit apertures of the camera for alternatively covering and uncovering the single aperture. The leader extends through the aperture thus covered and passes around the rear edge of the closure member, when the latter is at closed position, so as to project outwardly from the camera. The pull tab projects through the other exit aperture. Accordingly, because each pull tab, while being completely withdrawn, also draws the pull tab of the next film assembly after it through the uncovered exit aperture, while pulling the leader of the film assembly so that it projects from the camera also, the condition exists that both a leader and a pull tab are visible and available, simultaneously, during most of the processing operations, that is, during those relating to all but the last film unit of the film pack.

The aforesaid situation of concurrently visible first and second leader elements, namely, of elements which, although of different widths may appear quite similar to the operator, is confusing. The present invention obviates this possibility by providing that but one of these leader components for advancing the film assembly is visible and readily available at any operational stage and that it is the correct one for accomplishing the step to be performed at that stage. Accordingly, the possibility that the operator will grasp and draw upon the wrong leader component is completely avoided. Thus, through the instrumentality of the present closure device, when a first leader or draw tab of a given film unit is made visible, it alone is available for use in performing the necessary steps relating to arrangement of the film components prior to the actual processing step. When the second leader has been brought to its visible location through the aforesaid movement of the first leader, the second leader, alone, is available for use in processing the film assembly because the first leader has, by then, been completely separated from the film assembly and discarded and the first leader of the next film unit is obscured by the closure device.

While the apparatus of the invention serves particularly in the discriminatory sense, above described, with respect to the first and second leaders of the film assembly involved, it also performs the normal function of preventing the entrance into the camera of light which is actinic relative to photosensitive elements of the film assembly and the entrance of harmful foreign matter into exposure and processing areas, that is, when the camera is not in use or at a stage when the film materials are not undergoing advancement. In the performance of the above-described operations wherein, as stated, a film assembly comprising first and second sheets and a releasable processing liquid is drawn between pressure rolls, it is highly important that compressive forces be carefully controlled in such respects as evenness and direction of application. One factor leading to attainment thereof is the proper guidance of the leader and entire film assembly during their withdrawal from the pressure rolls so that pressures are not erroneously applied, as, for example, so that they are not applied predominantly to one face of the film assembly and to a minor degree to the other face. If the angle of withdrawal differs too greatly from the plane of the film assembly in approaching the pressure rolls, the released processing liquid may be spread as a layer of improper thickness and, thereby, the quality of the final photographic image may be seriously impaired. The device of the present invention includes structure which controls the angular limits of withdrawal of the film materials thus providing a proper thickness of the spread processing liquid.

In view of the foregoing considerations, objects of the present invention are to provide apparatus for use with a camera in which are exposed and processed a plurality of film assemblies of the character described, namely, apparatus which insures a correct and a more rapid discriminatory use of two leader elements of each film assembly; to provide apparatus wherein a closure member thereof is spring-biased to closed position and may be opened or held open in response either to direct manual manipulation or contact of film materials therewith; to provide apparatus comprising cooperating guide members for controlling the direction of film materials emanating from a pair of pressure rolls; and to provide a closure device which serves as a light- and dust-obstructing means for a pair of adjacent exit apertures of a camera of the character described.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein.

Figure 1:
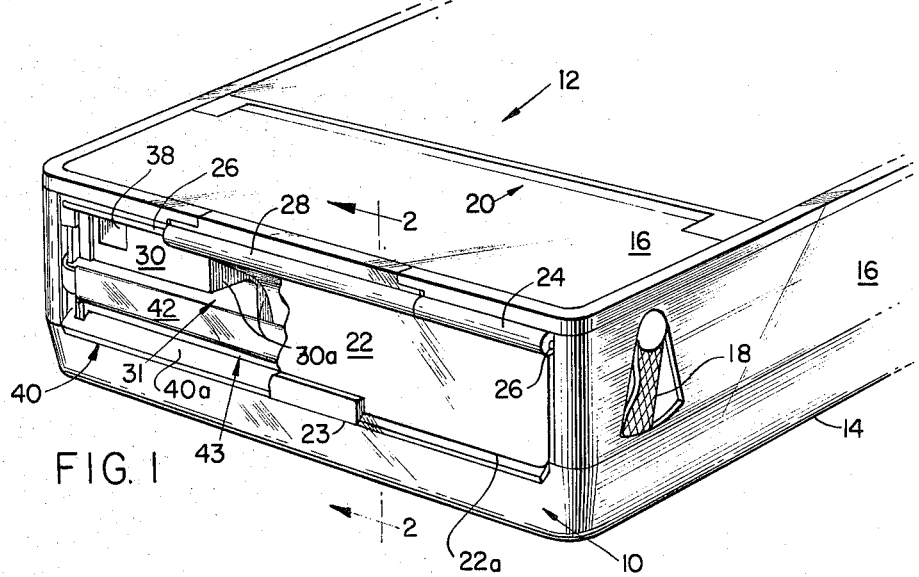
FIGURE 1 is a fragmentary perspective view of a camera housing or casing incorporating apparatus of the present invention, a closure member thereof being shown at closed position and, in part, broken away.
Figure 2:
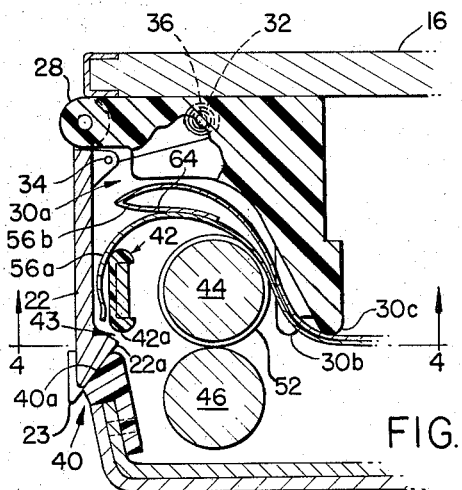
FIG. 2 is a diagrammatic cross-sectional side elevation view of the the apparatus taken along the line 2—2 of FIGURE 1, illustrating one stage of its operation with respect to a first leader of a film assembly, the closure member thereof being shown at closed position.
Figure 3:
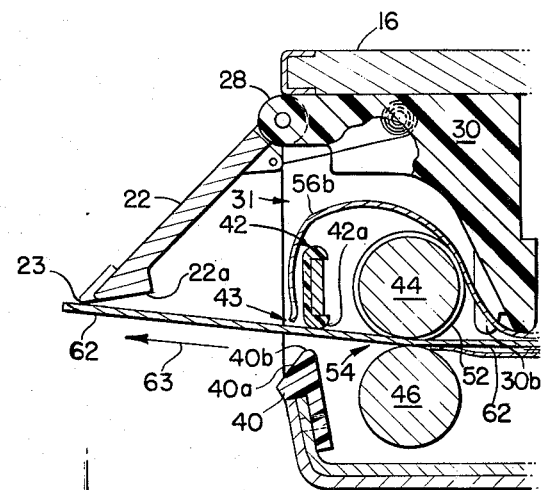
Figure 4:
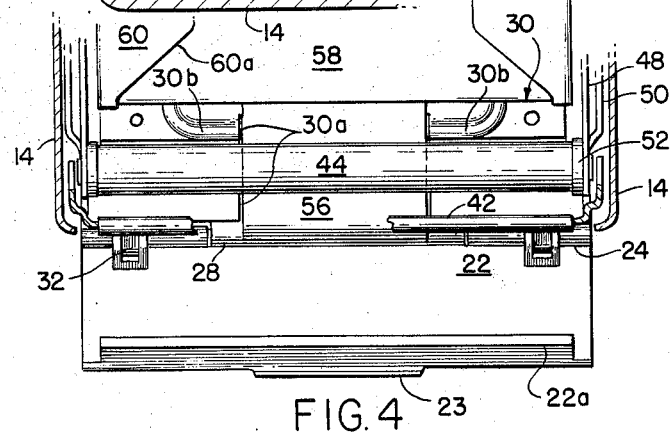

FIG. 3 is a diagrammatic, cross-sectional, side elevation view of the apparatus taken from a position similar to that of FIGURE 1, illustrating one stage of its operation with respect to a second leader of the film assembly, the closure member being shown at open position; and FIG. 4 is a fragmentary, schematic plan view, taken along the line 4—4 of FIG. 2, further illustrating the apparatus of the invention.

Referring now to FIGURE 1, there is illustrated the closure and associated apparatus 10 of the present invention mounted at one end of a camera housing 12 and, more particularly, on the forwardly-extending internal structure of a pivotal section 14 of the camera back which is releasably fastened to a fixed section 16 of the camera back by a hinge, not shown, and latching means 18. The camera may, suitably, be of a folding type having an extensible bellows and front, generally indicated at 20. The apparatus 10 comprises a principal rectangular closure or door member 22, pivotally attached along its front edge by hinge means 24, integral therewith, by the hinge pin 26, and by the fixed hinge means 28 which projects outwardly from and is integral with a multi-surfaced support member 30 attached to the fixed or non-pivotal portion of the camera back 16 within the housing thereof. A unitary ledge or lip 23 projecting slightly from the rear edge of the closure member 22 enables it to be swung open, manually. The closure member may, appropriately, be formed of any suitable plastic materal such, for example, as that manufactured under the trade name "Nylafil" by Fiberfil, Inc., Warsaw, Indiana, U.S.A. Assuming the pivotal section or door 14 of the camera to be closed and latched, the closure member 22 is biased to a closed position by a pair of coil springs 32, formed of spring steel and attached by pins 34 and 36 to the closure member 22 and the support member 30, respectively. A pair of apertures 38 formed in the support member 30 permits slidable movement of the flat portions of the springs therethrough during their operation. The closed position of the closure member 22 is determined by contact of its rear extremity 22a wtih an elongated bar element 40 fixedly mounted on the door 14 of the camera. The contacting surface 40a of the bar is acutely angled so as to substantially mate with the acutely angled surface 22a of the closure member. The aforesaid angular disposition or taper of the surfaces 22a and 40a provides an interface having a depth which, obviously, is greater than that which would be provided by forming the surfaces at 90° to the plane of the closure member 22. This serves to divert light rays which otherwise, inadvertently, might enter areas of the camera containing photosensitive materials. Assuming the closure member 22 to have been manually opened, it will immediately return toward a closed position, when released, under the bias of springs 32. The bar 40 or, more properly, its surface portion 40b also serves as a guide element for the film assembly during its advancement. A second elongated bar element 42 which is likewise fixedly attached to mounting structure of the door 14 of the camera and positioned forwardly of bar 40 includes a portion 42a which provides a second guide element with respect to the moving film assembly. The opening 43 between the guide elements 40b and 42a constitutes an exit aperture for the film assembly, exclusive of the first leader thereof. Each of the guide bars 40 and 42, as well as the support member 30, may, to advantage, be formed, wholly or in part, of a plastic material, such, for example, as that manufactured under the trade name "Implex" by Rohm and Haas Co., Philadelphia, Pennsylvania, U.S.A. The guide bar 42, as shown, is actually composed of a metal strip faced with the aforesaid plastic material. As used herein, the terms "front," "forwardly," etc. refer to proximity to the front of the camera and the terms "back," "rear," etc. are employed in an opposite sense.

Immediately inwardly of the closure member 22 is mounted a pair of pressure rolls 44 and 46 between which the film assemblies are advanced and compressed to effect their processing. The pressure rolls are rotatably mounted at each end in the extremities of a pair of pivotal arms 48 and 50, the latter, in turn, being mounted on structure attached to the door 14. The arms are so biased by spring means, not shown, as, for example, by a pair of elongated U-shaped springs, as to urge the pressure rolls toward one another. The limit of their adjacency is determined by a pair of flanges 52 extending around the periphery of the front roll 44 at each extremity thereof. The flanges provide a small spacing or slot 54 between the pressure rolls, even when no film materials are positioned therebetween. Of the structure thus far described, the guide elements 40 and 42 and the pressure rolls 44 and 46 are mounted through various intermediate supporting means on the inner surface of the door 14 of the pivotal camera back. The support member 30, with its various functional parts, the closure member 22 mounted thereon, and the film-pack are directly or indirectly mounted on or within the fixed portion 16 of the camera back. Thus by opening the back 14, the closure member 22 and the support member 30 are swung away from the pressure rolls permitting ready access thereto for any desired purpose. It is to be noted that the surfaces 40b and 42a of the guide members are substantially equidistant from the interface or "bite" of the pressure rolls.

The support member 30, includes a central, recessed or channeled portion 30a, formed in part by a pair of ridgelike depending members 30b terminating at each side of the channel at its inner extremity or entrance. The channel 30a serves as a passage for a resilient first leader element 56 of each film assembly 58 and its outer extremity 31, alone, or taken with the guide element 42 constitutes an exit aperture of the camera additional to the aperture 43, above described. A plurality of the film assemblies 58, supplied in a container 60, together constitute a film pack which is shown in part in FIG. 3, it being noted that an edge of the film pack abuts an edge of the support member 30 when it is loaded in the camera. The channel 30a of support member 30 also provides a recess which is capable of holding all of the first leaders or pull tabs 56 included in a full complement of film assemblies of the film pack. A film pack of practical dimensions may, appropriately, include some six or eight film assemblies of the character described. The first leader is releasably attached to the second resilient leader 62 of the film assembly. The film pack, as supplied, has all of the first leaders projecting through an open end 60a of the container 60.

When the film pack is loaded in the camera, an opaque cover sheet of the film pack, not shown, is initially positioned across an exposure aperture of the container 60. Prior to the first exposure, the cover sheet is removed by means of a leader. This leader is also releasably attached to the first leader of the foremost film assembly, namely, that which is first to be exposed and processed. Thus, when the cover sheet is removed, by manually opening the closure member 22 and pulling upon its leader, the first leader of the associated film assembly is brought to the position of the first leader 56a of FIG. 2. The folded first leader 56b of the second film assembly is releasably attached at 64 to the leader 56a so that when the latter is pulled upon, the leader 56b is unfolded to assume a position similar to that of the leader 56a. The first leaders of succeeding film assemblies, not shown, are similarly releasably attached to their predecessors so that each is unfolded, in order, and made available for successive withdrawal of the film assemblies. It is to be noted that each leader 56, during its advancement and just prior to entering the channel 30a, passes around a projecting guide element 30c at the rearmost extremity of, and integral with the support member 30. The guide element 30c serves the function, during the advancement of the first leader of each film assembly, of maintaining it substantially in the plane of a second film assembly leader 62 to which it is releasably attached. This condition is perpetuated until the trailing edge or limit of the small area of attachment of each first leader to a second leader has passed slightly beyond the guide element. At this stage, and by virtue of continued pulling upon and tension applied to the first leader 56, which holds the closure member 22 partially open in opposition to the bias of springs 32, the second leader 62 has been inserted in and advanced through the slot 54 provided between the pressure rolls 44 and 46 by the flanges 52, and between the guide members 40b and 42a to a location such that it projects slightly out of the camera and can be grasped manually and, at a second stage, drawn upon for completing the processing procedure. At this juncture, the trailing end of the first leader 56 has passed the guide member 30c and, because the tensioning force applied thereto is now suddenly directed sharply away from the second leader 62, the first leader is pulled free of the latter and is withdrawn completely from the camera where it is discarded. The second leader 62, from this point on, alone is visible and is employed to perform the second stage comprising the actual processing operation, namely to draw the entire film assembly 58 between the pressure rolls 44 and 46, thereby releasing a contained processing liquid between appropriate layers of the film assembly and producing the completed image by a diffusion transfer process.

The complete sequence of operations relative to a plurality of film assemblies will now be given to more fully explain the function of the apparatus of the invention. Let it be assumed merely by way of example and as represented by FIG. 2, that two film assemblies of a film pack remain in the camera and that one of these, associated with the first leader 56a, has just been photographically exposed. The closure member 22, covering both apertures 31 and 43, is first opened by inserting a finger-tip, of one hand under the overhanging extremity 23 and pivoting the closure member 22 outwardly, that is, clockwise as shown in FIG. 2, to an open position. Holding the closure member open with the other hand, the first leader 56a is grasped and pulled steadily and evenly through the aperture 31, the closure member 22 then being released and allowed to return to a partially closed position, under the influence of the springs 32, so as to rest on the surface of the tensioned draw tab during advancement of the latter. Shortly after the commencement of this procedure the first leader 56b of the second film assembly will be unfolded, as previously stated, by reason of its being releasably bonded to the first leader 56a at the area 64, and, during continued advancement of the first leader 56a, will assume a superimposed, contiguous slidable position with respect to the latter. The first leader 56a is directionally controlled during the aforesaid movement through contact with the guide element 30c, the channel 30a, the surface of pressure roll 44, and the guide member 42. Responsive to advancement of the first leader 56a, the second leader 62 of the film assembly, to which the first leader is separably attached, is caused to be inserted between the pressure rolls 44 and 46, that is, through the slot provided therebetween for the purpose by the flanges 52 of roll 44, and, thence, between the guide members 40 and 42 to a location whereat its forward portion projects slightly from the camera through the aperture 43. At this juncture, the first leader 56a pulls free of the second leader 62 by reason of the fact that the area at which it is releasably bonded thereto has passed the guide element 30c.

The closure member 22, being no longer held partially open by the tensioned first leader, starts to close and in so doing bears forcibly on the projecting second leader 62 and bends the latter so that it rests against the surface 40a of the guide bar 40. The closure member 22 thus assumes a substantially completely closed position, the second leader 62 projecting from between its rear edge 22a and the surface 40a.

The second leader 62 is now grasped firmly and drawn upon so as to be advanced in the direction of the arrow 63, as shown in FIG. 3, in a continuous even movement, the closure member 22 again opening partially and being held slidably thereupon, as illustrated, during the aforesaid movement by reason of the tension applied thereto overcoming the bias or force of the springs 32. The leader 62 is drawn upon steadily until the entire film assembly identified therewith has been advanced between the pressure rolls 44 and 46 and withdrawn from the camera, the guide surfaces 40b and 42a limiting the angle at which the assembly may be withdrawn from the rolls 44 and 46, as, for example, limiting the withdrawal direction to an angle of 10° relative to the plane in which the film assembly lies as it enters the pressure rolls. Within this angular limit, provided by the guide elements 40b and 42a, the processing liquid is spread to a satisfactory thickness. If the aforesaid limit were not provided, an incorrect thickness of the spread liquid could exist and the image might well be impaired. As soon as the film assembly has been withdrawn, the closure member 22 returns to its closed position under bias applied by the springs 32. The coil springs are chosen to exert a force capable of closing the closure member 22 only when the draw tab and leader are not undergoing advancement.

During the course of the aforesaid operations, that is, as performed through manually pulling upon the second leader 62, the processing liquid of the film assembly is released therewithin, is spread as a layer of even and proper thickness at least throughout an area coextensive with the intended image area, and is imbibed into the necessary film portions, a completed image being produced by a diffusion transfer process. Upon completing the withdrawal and processing of the first film assembly, the first leader 56b of the next or second film assembly is at a proper position, as shown in FIG. 3, for initiating a sequence of procedures with respect to a second film assembly identical to those above-described relative to the first film assembly.

From the foregoing description of the structure and operation of the closure device it will be apparent that although each film assembly necessarily comprises two leaders, termed first and second leaders herein, and although each leader must be manipulated manually and selectively advanced during a first or a second stage, respectively, to effect processing of the film assembly, but one leader is ever visible and, therefore, available for use at either operational stage. The proper selection is thus more or less automatic. This avoids the possibility of confusion which might be attendant upon the appearance of two leaders projecting simultaneously from the camera and requiring the operator's choice as to which should be employed for a given function.

Since certain changes may be made in the above apparatus without departing from the scope of the invention herein involved, it is intended that all matter contained in

What is claimed is:

1. For use with a camera of a type adapted to photographically expose and process a film assembly having a pair of leaders, a first leader of which is releasably attached, said leaders being used in advancing said film assembly in two successive stages including a second stage of passage between pressure-applying means of said camera for processing purposes, apparatus for so successively withdrawing said leaders that only a single correct leader is available for use at a given processing stage, said apparatus comprising means forming a pair of elongated narrow apertures at one end of said camera, a pivotally mounted closure member for covering and uncovering both said apertures to permit the selective advancement of said leaders therethrough during said two processing stages, spring means biasing said closure member toward a closed position, fixed means adapted to contact said closure member for establishing a closed position thereof, and means integral with said closure member for manually opening said member in opposition to the bias applied by said spring means, said closure member and pair of apertures being so positioned and arranged with respect to one another and to said pressure-applying means that said closure member is adapted to be held open by drawing upon said first leader through a first of said apertures, said first leader thereby serving to draw the second of said leaders between said pressure-applying means and through the second of said aperatures, said closure member, as influenced by said biasing means, being brought into contact with said second leader when said first leader is caused to separate from said film assembly.

2. An apparatus, as defined in claim 1, wherein said means for establishing a closed position of said closure member is an elongated bar having a tapered edge.

3. An apparatus, as defined in claim 2, wherein said closure member and said bar have mating, acutely-angled surfaces.

4. An apparatus, as defined in claim 1, wherein said spring means is a pair of coil springs having a given resiliency, attached, respectively, to said closure member and fixed mounting means of said camera.

5. An apparatus, as defined in claim 1, wherein said closure member is mounted immediately adjacent to said pressure-applying means in the form of a pair of pressure rolls of said camera.

6. For use with a camera of a type adapted to photographically expose and process a film assembly having a pair of leaders, a first leader of which is releasably attached, said leaders being used in advancing said film assembly in two successive stages including a second stage of passage between a pair of slightly spaced pressure rolls of said camera for processing purposes, apparatus for successively withdrawing said leaders, said apparatus comprising support means having a channel formed therein constituting a first aperture for manually withdrawing said first leader to complete a first of said stages, a pair of mutually spaced guide means forming a second aperture therebetween for manually withdrawing both the other of said leaders and film materials of said assembly attached thereto to complete a second of said stages, a device for normally covering both said apertures to prevent the entrance of actinic light and foreign matter into said camera and for intermittently uncovering and covering said apertures to permit the advancement of said leaders selectively therethrough during said two processing stages in a manner such that only a correct one of said leaders is available for use at either of said processing stages, said device comprising a generally rectangular closure member pivotally attached to support means of the camera at said camera end and, at closed position, covering an area thereof encompassing both said apertures, spring means biasing said closure member toward a closed position as determined by contact with a fixed member of said camera mating therewith, and means integral with said closure member for manually pivoting said member to an open position against the bias of said spring means, said closure member and apertures being so positioned and arranged relative to one another and to said pressure rolls that said closure member is adapted to be held open by drawing upon said first leader through said first aperture, said first leader thereby serving to draw said other leader between said pressure rolls and through said second aperture, said closure member, urged by said biasing means, being moved into contact with said other leader when said first leader is caused to separate from said other leader.

7. An apparatus, as defined in claim 6, wherein said spaced guide means are so mutually separated and positioned with respect to said pair of pressure rolls of said camera as to be located substantially equidistant from an extension of the interface of said rolls and as to limit the angle of withdrawal of said other of said leaders said pair of pressure rolls, said angle being taken in either pair of pressure rolls, said angle being taken in either of a forward or a rearward direction with respect to the plane of said film assembly in entering said rolls.

8. Camera apparatus adapted to photographically expose and process a plurality of film assemblies of a film pack, each having a pair of leaders, a first leader of which is releasably attached, said leaders being used to advance it in two successive stages including a second stage of passage between a pair of pressure rolls of said camera for processing purposes, said apparatus comprising a first fixed housing section, a second housing section pivotally attached to the first housing section, means for holding said housing sections in contiguous relation, means forming a first aperture in an end of said first housing section for manually withdrawing said first leader therethrough to complete the first of said stages, means forming a second aperture in an end of said second housing section for manually withdrawing the other of said leaders and film materials attached thereto to complete the second of said stages, a device for normally covering both said apertures to prevent the entrance of actinic light and foreign matter into said camera and for alternately uncovering and covering said apertures to permit the advancement of said leaders therethrough during said two processing stages so that only a correct one of said leaders is visible and available for a processing purpose at any time, said device comprising a generally rectangular closure member pivotally attached to mounting means of said first housing section and, at a closed position, covering an area of both sections which includes both said apertures, spring means biasing said closure member toward a closed position, elongated fixed closure means mounted on said second section for contacting said pivotal closure member and establishing said closed position thereof and means associated with said closure member for manually pivoting said member to an open position against the bias of said spring means, said closure member and aperture being so positioned and arranged relative to one another and to said pressure rolls that said closure member is adapted to be held open by drawing upon said first leader through said first aperture, said first leader thereby serving to draw said other leader between said pressure rolls and through said second aperture, said closure member, urged by said biasing means, being moved into contact with said other leader when said first leader is caused to separate from said other leader.

9. Camera apparatus, as defined in claim 8, wherein said first housing section has a substantially open end which is covered by said closure member, at closed position.

10. Camera apparatus, as defined in claim 8, wherein said first aperture is formed in a configurated support member attached to said first housing section and wherein said spring means and closure member are also mounted on said support member.

11. Camera apparatus, as defined in claim 8, wherein said means forming said second aperture are, respectively, an elongated guide bar and, in spaced relation thereto, said elongated fixed closure means, both being mounted on said second section.

12. For use with a camera of a type adapted to photographically expose and process a film assembly having a pair of leaders, a first leader of which is releasably attached, said leaders being used in advancing said film assembly in two successive stages including a second stage of passage between a pair of pressure rolls of said camera for processing purposes, the camera including a pair of elongated apertures at one end thereof for manually withdrawing at least said leaders, a device for normally covering said apertures to prevent the entrance of actinic light and foreign matter into said camera and for intermittently uncovering and covering said apertures to permit the advancement of said leaders selectively therethrough during said two processing stages in a manner such that only a correct one of said leaders is available for use at either of said processing stages, said device comprising a generally rectangular closure member pivotally attached to support means of the camera at said camera end and, at closed position, covering an area thereof encompassing both said apertures, spring means biasing said closure member toward a closed position as determined by its contact with a fixed member of said camera having an edge mating therewith, and means integral with said closure member for manually pivoting said member to an open position against the bias of said spring means, said closure member and pair of apertures being so positioned and arranged with respect to one another and to said pressure rolls that said closure member is adapted to be held open by drawing upon said first leader through a first of said apertures, said first leader at the same time thereby serving to draw the second of said leaders between said pressure rolls and through the second of said apertures, said closure member, urged by said biasing means, being moved into contact with said second leader when said first leader is separated from said film assembly.

References Cited by the Examiner

UNITED STATES PATENTS 3,080,805  3/1963  Hamilton _____ 95—13
3,165,040  1/1965  Hamilton _____ 95—13

NORTON ANSHER, *Primary Examiner.*